(12) United States Patent
Lee et al.

(10) Patent No.: US 7,697,905 B2
(45) Date of Patent: Apr. 13, 2010

(54) LOCAL OSCILLATOR FEEDTHROUGH CANCELLATION SCHEME TO REMOVE RF AND BASEBAND OFFSETS

(75) Inventors: C. Paul Lee, San Diego, CA (US); Arya Behzad, Poway, CA (US)

(73) Assignee: Qualcomm Incorporation, San Diego, CA (US)

( * ) Notice: Subject to any disclaimer, the term of this patent is extended or adjusted under 35 U.S.C. 154(b) by 1027 days.

(21) Appl. No.: 11/303,235

(22) Filed: Dec. 16, 2005

(65) Prior Publication Data

US 2006/0094395 A1    May 4, 2006

Related U.S. Application Data

(63) Continuation-in-part of application No. 11/167,407, filed on Jun. 27, 2005, now Pat. No. 7,433,662.

(60) Provisional application No. 60/609,192, filed on Sep. 10, 2004, provisional application No. 60/716,902, filed on Sep. 14, 2005.

(51) Int. Cl.
*H04B 1/04* (2006.01)

(52) U.S. Cl. .............. 455/114.2; 455/114.1; 455/115.1; 455/127.1; 455/127.2; 455/67.11; 455/67.13; 455/67.14; 455/67.16; 375/284; 375/295; 375/296; 375/346

(58) Field of Classification Search .............. 455/115.1, 455/285, 326, 24, 67.11, 67.13, 67.14, 67.16, 455/84, 85, 91, 114.2, 127.1, 147, 209, 296, 455/310, 317, 323; 375/296, 329, 284, 295, 375/346; 332/103, 144; 330/253, 258
See application file for complete search history.

(56) References Cited

U.S. PATENT DOCUMENTS

| | | | | |
|---|---|---|---|---|
| 4,717,894 A | * | 1/1988 | Edwards et al. | 332/144 |
| 5,642,078 A | * | 6/1997 | Navabi et al. | 330/253 |
| 5,798,660 A | | 8/1998 | Cheng | |

(Continued)

OTHER PUBLICATIONS

Liu "5-GHz CMOS Radio Transceiver Front-End Chipset", IEEE, vol. 35, NO. Dec. 12, 2000, pp. 1927-1933.*

(Continued)

*Primary Examiner*—Edward Urban
*Assistant Examiner*—Junpeng Chen
(74) *Attorney, Agent, or Firm*—Stanton Braden

(57) ABSTRACT

An scheme to provide local oscillator feedthrough offset cancellation to remove baseband and radio frequency coupled offsets. Two separate offset cancellation currents are injected at a driver which drives a baseband signal into a mixer to mix with a local oscillator signal. One offset cancellation current cancels a baseband local oscillator feedthrough offset, while the other offset cancellation current cancels a radio frequency local oscillator feedthrough offset.

17 Claims, 10 Drawing Sheets

U.S. PATENT DOCUMENTS

| | | | |
|---|---|---|---|
| 5,847,619 A * | 12/1998 | Kirisawa | 332/103 |
| 6,040,731 A | 3/2000 | Chen et al. | |
| 6,046,640 A | 4/2000 | Brunner | |
| 6,265,949 B1 * | 7/2001 | Oh | 332/103 |
| 6,594,504 B1 | 7/2003 | Grasset | |
| 6,763,227 B2 * | 7/2004 | Kramer | 455/115.1 |
| 6,970,689 B2 * | 11/2005 | Khorram | 455/326 |
| 7,257,382 B2 | 8/2007 | Arai et al. | |
| 2004/0229589 A1 * | 11/2004 | Behzad | 455/285 |
| 2004/0252782 A1 * | 12/2004 | Demir et al. | 375/296 |
| 2005/0058227 A1 * | 3/2005 | Birkett et al. | 375/329 |
| 2005/0140445 A1 * | 6/2005 | Kim et al. | 330/258 |
| 2006/0094395 A1 | 5/2006 | Lee et al. | |
| 2007/0042728 A1 * | 2/2007 | Pan | 455/127.1 |
| 2007/0109028 A1 * | 5/2007 | Craninckx | 327/113 |

OTHER PUBLICATIONS

"5-GHz CMOS Radio Transceiver Front-End Chipset"; Ting-Ping Liu et al.; IEEE Journal of Solid-State Circuits, vol. 35, No. 12; Dec. 2000; pp. 1927-1933.

* cited by examiner

LOCAL OSCILLATOR FEEDTHROUGH CANCELLATION SCHEME TO REMOVE RF AND BASEBAND OFFSETS

PRIORITY INFORMATION

This application is a continuation-in-part (CIP) application of and claims priority to U.S. patent application having an application Ser. No. 11/167,407; filed Jun. 27, 2005 now U.S. Pat. No. 7,433,662; and titled "Mixer Gain Control With Gain Tracking Offsets," which application claims benefit of priority to U.S. Provisional Application Ser. No. 60/609,192; filed Sep. 10, 2004 and titled "Mixer Gain Control Scheme With Gain Dependent Offsets."

This application also claims the benefit of priority to U.S. Provisional Application Ser. No. 60/716,902; filed Sep. 14, 2005; and titled "Local Oscillator Feedthrough Cancellation Scheme To Remove RF and Baseband Offsets."

All of the applications noted above are incorporated herein by reference in their entirety.

BACKGROUND OF THE INVENTION

1. Technical Field of the Invention

The embodiments of the invention relate to communication devices and more particularly to a local oscillator feedthrough cancellation scheme to remove RF and baseband offsets.

2. Description of Related Art

Communication systems are known to support wireless and wire lined communications between wireless and/or wire lined communication devices. Such communication systems range from national and/or international cellular telephone systems to the Internet to point-to-point in-home wireless networks. Communication systems typically operate in accordance with one or more communication standards. For instance, wired communication systems may operate according to one or more versions of the Ethernet standard, the System Packet Interface (SPI) standard, or various other standards. Wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled-to an associated radio transceiver (e.g., a station for in-home and/or in-building wireless communication networks, RF modem, etc.). Typically, the transceiver includes a data modulation stage and an RF stage. The data modulation stage (baseband process) converts between data and baseband signals in accordance with the particular wireless communication standard. The RF stage (transmitter section and receiver section) converts between baseband signals and RF signals. The RF stage may be a direct conversion transceiver that converts directly between baseband and RF or may include one or more intermediate frequency stages.

Wireless communication devices utilize gain control circuitry to provide control over amplification. One type of gain control circuitry incorporates differential amplifiers. For example, a Gilbert cell mixer may employ such differential amplification stage or stages where gain may be adjusted. Although there are variety of techniques to adjust gain, many amplifiers adjust the gain of the amplifier without adjusting the gain of the offset voltages. For example, with a Gilbert cell mixer, a transconductance stage is typically employed to convert a voltage input into current to drive the mixer stage. The transconductance stage generally generates some amount of offset, since not all of the transistors in the transconductance stage are matched. This offset may be represented as a small direct current ($\Delta DC$) and when coupled to the mixer the $\Delta DC$ current causes a local oscillator feedthrough (LOFT) at the mixer output.

The offset may not be a significant concern, if the input signal to the transconductance stage is sufficiently higher than the offset, so that amplification of the offset is minimal compared to the actual signal. However, in other instances, the offset may be enough to affect the mixer drive current, which may result in appreciable LOFT. LOFT is a problem if it exceeds a leakage amount specified by a communication standard or if the feedthrough is sufficient to cause the receiver to not receive the signal properly.

Furthermore, current techniques do not sort out the LOFT contributions, so that two of the mechanisms that cause the LOFT at a transmit up-conversion stage are not separately cancelled. Baseband (BB) LOFT contribution generally originates from the device offsets in the digital-to-analog converter, low-pass filter, the transconductance stage(s) and any other baseband circuits in the signal path. The offsets mix with a local oscillator (LO) and generate a LO component at the output of the mixer. The second type, RF LOFT, is a direct coupling component either through parasitic capacitance or mutual inductance.

Accordingly, because there are at least two types of LOFT to address, it would be advantageous to implement a dual cancellation scheme to cancel both types of offsets separately at the up-conversion stage of a communication device.

SUMMARY OF THE INVENTION

The present invention is directed to apparatus and methods of operation that are further described in the following Brief Description of the Drawings, the Detailed Description of the Embodiments of the Invention, and the Claims. Other features and advantages of the present invention will become apparent from the following detailed description of the embodiments of the invention made with reference to the accompanying drawings.

DETAILED DESCRIPTION OF THE EMBODIMENTS OF THE INVENTION

The embodiments of the present invention may be practiced in a variety of settings that implement a differential amplifier that employs a dual LOFT cancellation scheme.

Figure 1:
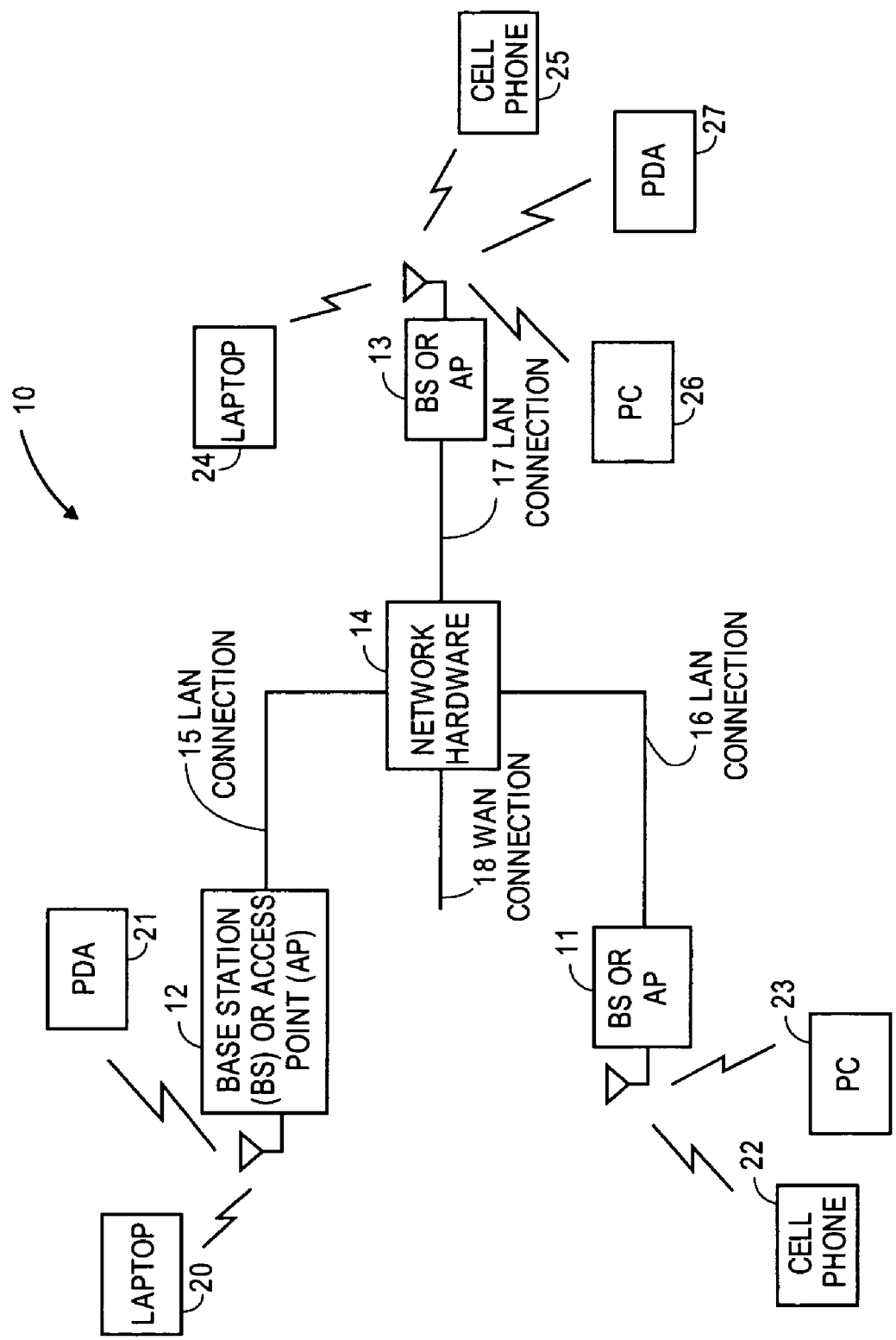
FIG. 1 is a block schematic diagram illustrating a wireless communication system in accordance with one embodiment of the present invention.

FIG. 1 is a schematic block diagram illustrating a communication system 10 that includes a plurality of base stations (BS) and/or access points (AP) 11-13, a plurality of wireless communication devices 20-27 and a network hardware component 14. Wireless communication devices 20-27 may be laptop host computers 20 and 24, personal digital assistant hosts 21 and 27, personal computer hosts 23 and 26, cellular telephone hosts 22 and 25, and/or any other type of device that supports wireless communications. The details of the wireless communication devices will be described with reference to FIG. 2.

Base stations or access points 11-13 may be operably coupled to network hardware 14 via respective local area network (LAN) connections 15-17. Network hardware 14, which may be a router, switch, bridge, modem, system controller, et cetera, may provide a wide area network (WAN) connection 18 for communication system 10. Individual base station or access point 11-13 generally has an associated antenna or antenna array to communicate with the wireless communication devices in its area. Typically, the wireless communication devices register with a particular base station or access point 11-13 to receive services within communication system 10. For direct connections (i.e., point-to-point communications), wireless communication devices may communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifiers and/or programmable multi-stage amplifiers to enhance performance, reduce costs, reduce size, and/or enhance broadband applications.

Figure 2:
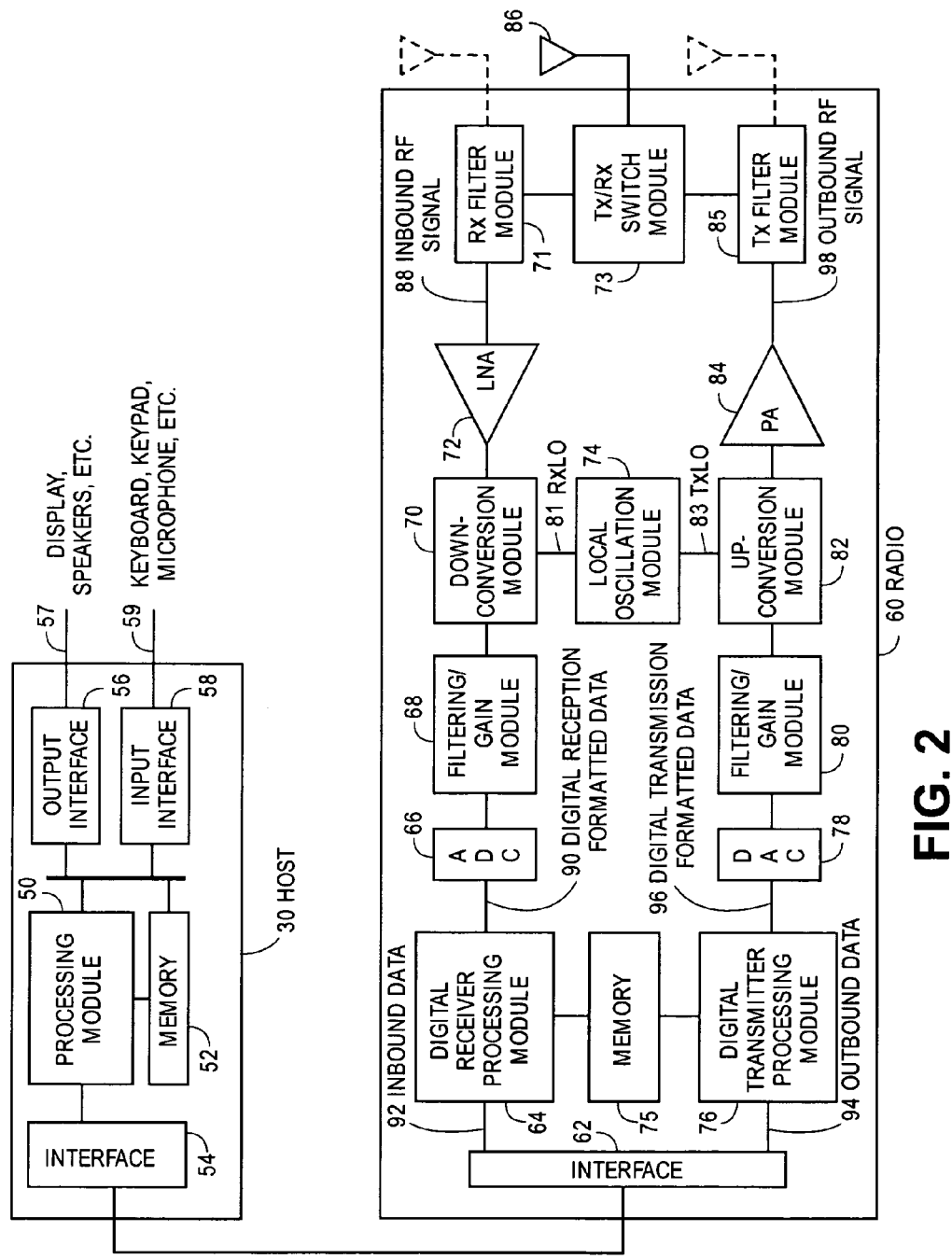
FIG. 2 is a schematic block diagram illustrating a wireless communication device in accordance with one embodiment of the present invention.

FIG. 2 is a schematic block diagram illustrating a wireless communication device that includes a host unit 30 and an associated radio unit 60. Host unit 30 may be incorporated in a communication device, such as one or more of the wireless communication devices 20-27 shown in FIG. 1. For cellular telephone hosts, radio 60 is typically a built-in component. For personal digital assistants hosts, laptop hosts, and/or personal computer hosts, radio 60 may be built-in or may be an externally coupled component that couples to host device 30 via a communication link, such as a PCI interface, PCMCIA interface, USB interface, or another type of interface.

As illustrated, host device 30 includes a processing module 50, memory 52, radio interface 54, input interface 58, and output interface 56. Processing module 50 and memory 52 execute corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For inbound data received from radio 60, radio interface 54 provides the data to processing module 50 for further processing and/or routing to output interface 56. Output interface 56 provides connectivity to an output display device 57, such as a display, monitor, speakers, et cetera, such that the received data may be displayed or otherwise output. Radio interface 54 also provides outbound data from processing module 50 to radio 60. Processing module 50 may receive the outbound data from an input device 59, such as a keyboard, keypad, microphone, et cetera, via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter (ADC) 66, a filtering/gain/attenuation module 68, an intermediate frequency (IF) mixing down conversion stage noted as down-conversion module 70, a receiver filter module 71, a low noise amplifier (LNA) 72, a transmitter/receiver (Tx/Rx) switch module 73, a local oscillation module 74, a memory 75, a digital transmitter processing module 76, a digital-to-analog converter (DAC) 78, a filtering/gain/attenuation module 80, an IF mixing up conversion stage noted as up-conversion module 82, a power amplifier (PA) 84, a transmitter filter module 85, and an antenna 86. The antenna 86 may be a single antenna that is shared by the transmit and receive paths as controlled by Tx/Rx switch 73, or may include separate antennae for the transmit path and receive path (shown by the dotted line). The antenna implementation may depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. Digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when processing module 64 and/or 76 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry. Memory 75 stores, and the processing module 64 and/or 76 executes, operational instructions that facilitate functionality of the device. In some embodiments, the combination of digital receiver processing module 64, digital transmitter processing module 76 and memory 75 may be referred to together as a "baseband processor."

In operation, radio 60 receives outbound data 94 from host 30 via host interface 62. Host interface 62 routes outbound data 94 to digital transmitter processing module 76, which processes outbound data 94 in accordance with a particular wireless communication standard (e.g., IEEE802.11a, IEEE802.11b, IEEE802.11g, Bluetooth, et cetera) to produce digital transmission formatted data 96. Digital transmission formatted data 96 is typically a digital base-band signal or a digital low IF signal, where the low IF typically may be in the frequency range of one hundred kilohertz to a few megahertz (MHz).

Digital-to-analog converter 78 converts digital transmission formatted data 96 from the digital domain to the analog domain. Filtering/gain/attenuation module 80 filters and/or adjusts the gain of the analog signal prior to providing it to up-conversion module 82 for mixing. Up-conversion module 82 directly converts the analog baseband or low IF signal into an RF signal based on a transmitter local oscillation (Tx LO) 83 provided by local oscillation module 74. Power amplifier 84 amplifies the RF signal to produce outbound RF signal 98, which is filtered by transmitter filter module 85. Antenna 86 propagates outbound RF signal 98 to a targeted device such as a base station, an access point and/or another wireless communication device.

Radio 60 also receives inbound RF signal 88 via antenna 86, which was transmitted by a base station, an access point, or another wireless communication device. Antenna 86 provides inbound RF signal 88 to receiver filter module 71 via Tx/Rx switch 73, where Rx filter 71 bandpass filters inbound RF signal 88. Rx filter 71 provides the filtered RF signal to low noise amplifier 72, which amplifies signal 88 to produce an amplified inbound RF signal. The low noise amplifier 72 provides the amplified inbound RF signal to down-conversion module 70, which directly converts the amplified inbound RF signal into an inbound low IF signal or baseband signal based on a receiver local oscillation (Rx LO) 81 provided by local oscillation module 74. Down-conversion module 70 provides the inbound low IF signal or baseband signal to filtering/gain/attenuation module 68. Filtering/gain/attenuation module 68 may be implemented to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to host device 30 via radio interface 54.

As one of ordinary skill in the art will appreciate, the particular wireless communication device of FIG. 2 may be implemented using one or more integrated circuits. For example, host 30 may be implemented on one integrated circuit and digital receiver processing module 64, digital transmitter processing module 76 and memory 75 may be implemented on a second integrated circuit, and the remaining components of radio 60, less the antenna 86, may be implemented on a third integrated circuit. As an alternative embodiment, radio 60 may be implemented on a single integrated circuit. As yet another alternative embodiment, processing module 50 of host 30 and digital receiver and transmitter processing modules 64 and 76 may be a common processing device implemented on a single integrated circuit. Further, memory 52 and memory 75 may be implemented on a single integrated circuit and/or on the same integrated circuit as the common processing modules of processing module 50 and digital receiver and transmitter processing module 64 and 76. Generally, radio 60 is defined as having a baseband portion (shown to the left of LNA 72 and PA 84) and a RF portion (the remaining RF components).

Figure 3:
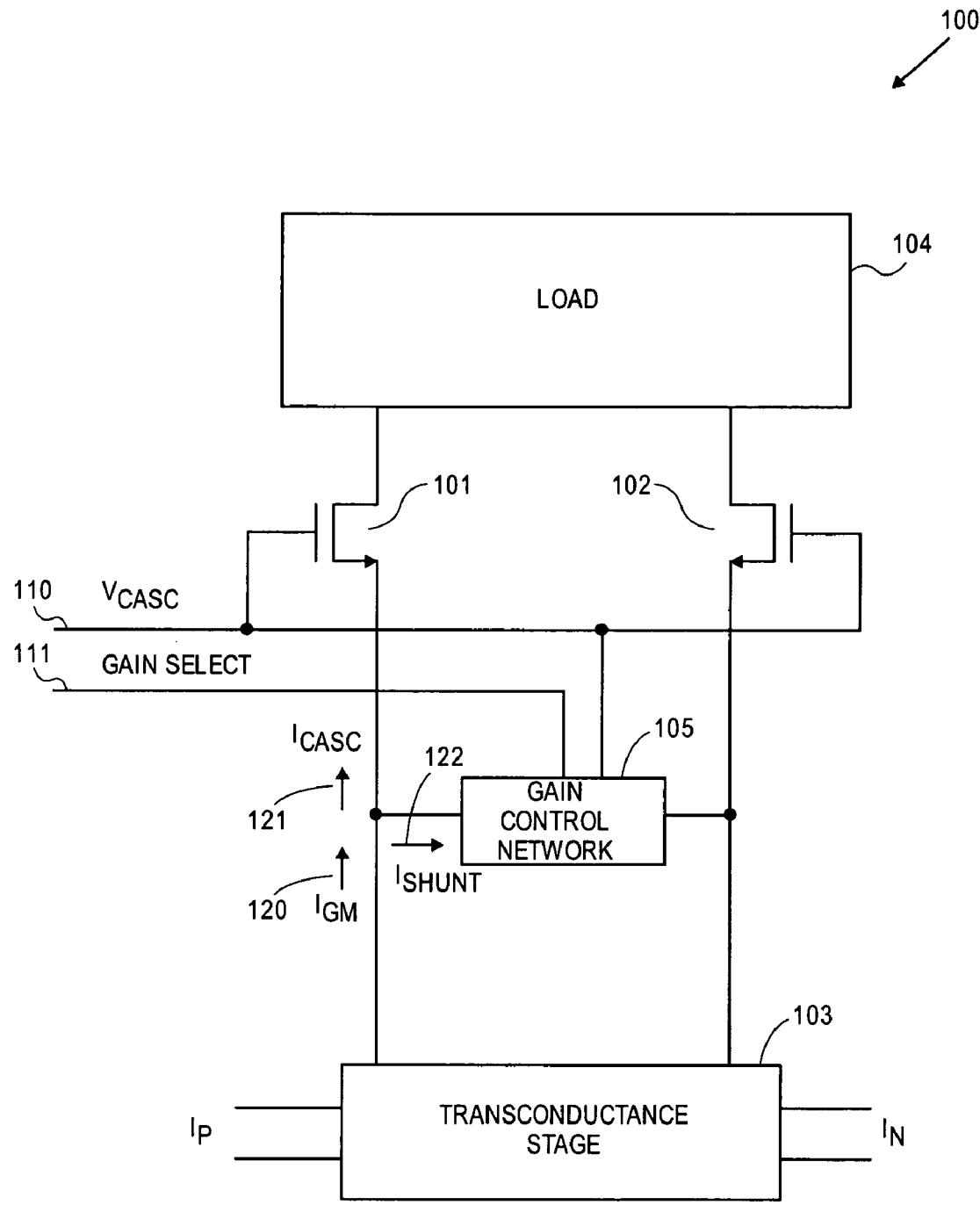
FIG. 3 is a block schematic diagram illustrating one embodiment of a gain control scheme disposed across source terminals of a differential amplifier stage.

FIG. 3 shows one embodiment of a gain control scheme for a driver circuit 100 that may be utilized to drive a signal from a transconductance stage. Circuit 100 comprises a pair of cascode arranged transistors 101, 102, in which their source terminals are coupled to receive a differential drive current from a current source, such as a transconductance stage 103. A load 104 is coupled to the drain terminals of transistors 101, 102, which load 104 is driven by the drive current. A gain control network 105 is coupled across the source terminals of the cascode transistors 101, 102. A cascode bias voltage $V_{CASC}$ 110 is coupled to gates of transistors 101, 102. In the particular embodiment shown, $V_{CASC}$ is also coupled to gain control network 105, along with a GAIN SELECT signal 111. The cascode arrangement has high impedance at the drain so as to provide high impedance coupling of transconductance stage 103 to load 104. As noted in the description below, a common practice is to use a transconductance amplifier to drive a mixer load in a communication device. However, embodiments of the invention may be readily adapted to employ one of a variety of current sources to drive a load and need not be limited to the use of a transconductance stage to drive a mixer. In one embodiment, the load is a Gilbert cell mixer.

Thus, cascode transistors 101, 102 are utilized to couple the drive current from transconductance stage 103 to load 104. As to how much of the drive current is actually coupled to load 104 is dependent on the action of gain control circuit 105. As noted, $I_{GM}$ denotes one leg of the differential drive current from transconductance stage 103. Depending on the setting of gain control network 105, a portion of $I_{GM}$ is shunted to gain control network 105 and is shown as shunt current $I_{SHUNT}$. The remaining current, cascode current $I_{CASC}$ 121, is coupled to transistor 101. Thus, gain control network 105 operates as a current divider, so that $$I_{GM}=I_{SHUNT}+I_{CASC}$$

Assuming that $I_{GM}$ stays substantially constant, adjusting the value of $I_{SHUNT}$ results in a proportional adjustment of $I_{CASC}$ in the opposite direction. Since $I_{CASC}$ is the drive current to the cascode transistors 101, 102, which differentially drive load 104, the value of $I_{CASC}$ may be used to set the amplification factor (gain) available. Gain control network 105 is used to directly set the value of $I_{SHUNT}$ and, therefore, indirectly set the value for $I_{CASC}$. Although gain control network 105 may be fixed, so that gain of circuit 100 is also fixed, one embodiment of the invention allows gain control network 105 to be adjustable, by making $I_{SHUNT}$ adjustable. In one embodiment, a GAIN SELECT signal is used to select the value of $I_{SHUNT}$ and allow for the selection of a gain value for circuit 100. As will be noted below, in one embodiment, GAIN SELECT is made programmable so that gain may be programmably selected.

The bias voltage $V_{CASC}$ is also coupled to gain control network 105 in circuit 100. Although a different bias voltage may be coupled to gain control network 105, one embodiment of circuit 100 applies the same $V_{CASC}$ voltage on gates of shunt transistors of gain control network 105. Accordingly, when differential input signals $I_P$ and $I_N$ are coupled as differential inputs to transconductance stage 103, stage 103 converts the $I_P/I_N$ voltages to current to generate the drive current to load 104. The drive current from stage 103 is gain adjusted by gain control network 105. In the shown example, gain control network 105 adjusts the amount of $I_{SHUNT}$, so that network 105 functions as an attenuator to adjust the gain. It is to be noted that a variety of amplification control or attenuation control circuitry may be utilized to perform the gain control at the source terminals of the cascode transistors 101, 102.

When load 104 is a mixer, input signals $I_P$ and $I_N$ are used to provide one set of differential drive signals to the mixer. For example, if the mixer is in a transmit path, such as in up-conversion module 82 of FIG. 2, the mixer may combine a modulation signal with a local oscillator (LO) to generate a modulated RF signal. Transconductance stage 103 provides one set of inputs to such a mixer.

In most applications, transconductance stage 103 generates an offset current. The offset is generated from various combination of factors, but one primary cause is due to mismatched $V_T$ of transistors in the transconductance circuit. The offset is a DC component that adds/subtracts from the drive current. As noted in the background section above, the offset may contribute to the LOFT. By placing gain control network 105 between transconductance stage 103 and load 104, the offset current is subjected to the same gain adjustment as the drive current, since the offset current is shunted in the approximate same proportion as $I_{GM}$ to $I_{SHUNT}$. That is, the offset current is gain scaled to the drive current.

Since the adjustment is performed at the source of the cascode transistors 101, 102, no new offsets are introduced by additional transistors, other than transistors 101, 102. However, because of source degeneration presented by the cascode arrangement, the cascode transistors 101, 102 do not contribute appreciable offset. Furthermore, if transistors 101 and 102 are manufactured as matched transistors, then hardly any offset would be introduced by transistors 101, 102 in driver circuit 100. However, offsets from earlier stage(s) are still present and may have appreciable impact on load 104.

Figure 4:
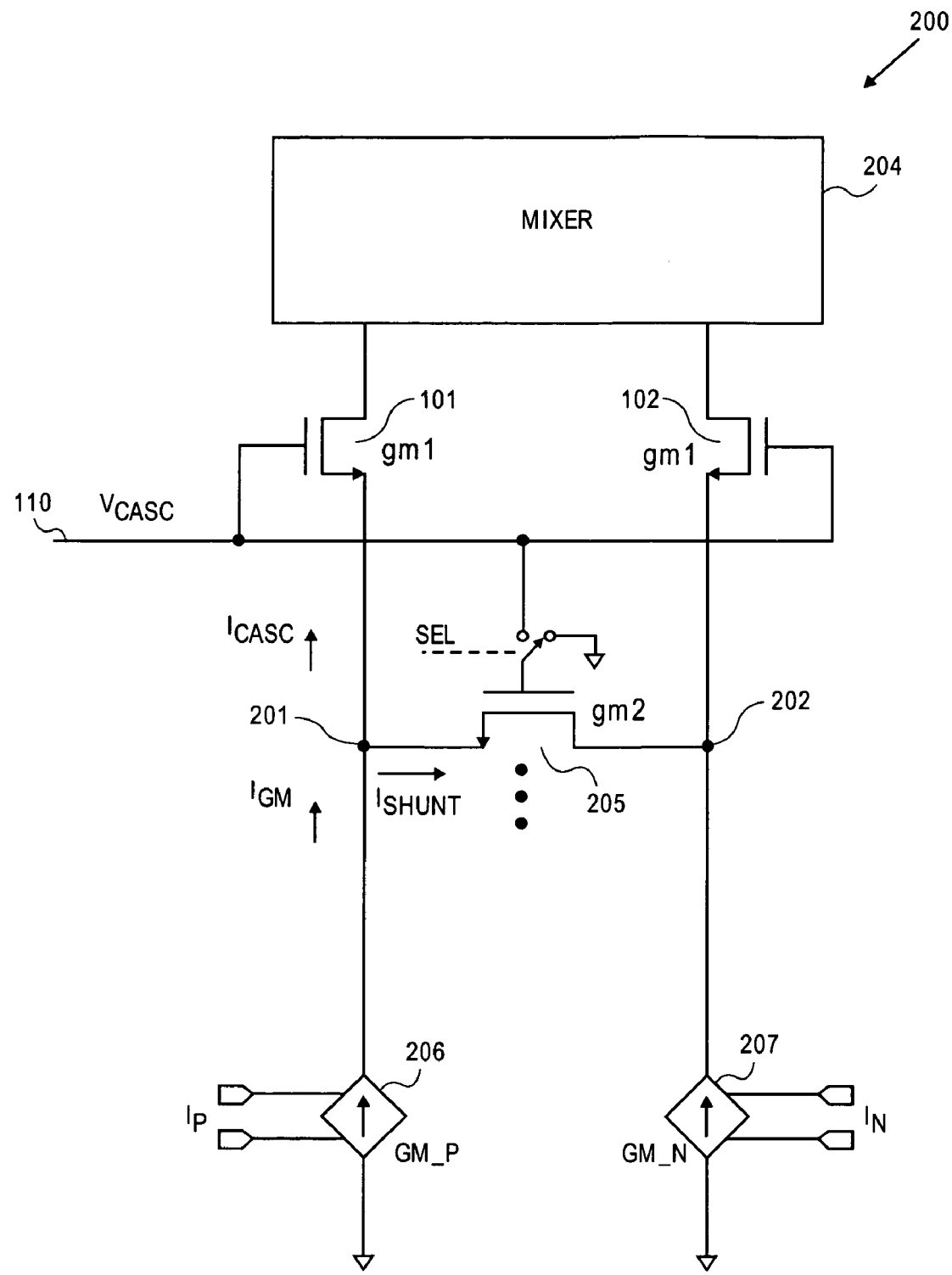
FIG. 4 is a circuit schematic diagram of one embodiment of a differential gain control circuit for the schematic diagram of FIG. 3, in which one or more shunt transistors are disposed across source terminals of cascode transistors to adjust gain of the current feeding a mixer.

FIG. 4 shows one embodiment for implementing circuit 100 of FIG. 3. In FIG. 4, a circuit 200 employs cascode transistors 101, 102 as drivers with their gates coupled to $V_{CASC}$ 110. Load 104 of FIG. 3 is now shown as a mixer load 204. Although a variety of mixer circuits may be employed, in one embodiment, mixer load 204 is a Gilbert Cell mixer, in which current drive from transistors 101, 102 determines the gain of mixer 204. For the embodiment of FIG. 4, transconductance stage 103 is represented by a pair of transconductance current sources GM_P 206 and GM_N 207. In this particular embodiment, differential voltage input signals $I_P$ and $I_N$ generate the drive currents.

Gain control network 105 of FIG. 3 is now shown as one or more transistors 205 in circuit 200. Although only one transistor 205 is shown in FIG. 4, it is to be noted that there may be a plurality of transistors arranged across nodes 201 and 202. $I_{SHUNT}$ represents the amount of current flowing between nodes 201 and 202, whether there is only one active transistor or multiple active transistors across nodes 201, 202. In the particular embodiment of circuit 200, either $V_{CASC}$ is applied to the gate of transistor 205 to turn on (activate) transistor 205 or a low potential, such as ground, is placed on the gate to turn off (deactivate) transistor 205. Signal SEL is used to control which potential is to be switched on to the gate of transistor 205. The SEL signal corresponds to the GAIN SELECT signal of FIG. 3 when multiple transistors 205 are present. Although a ground is shown coupled to the gate of transistor 205, a low voltage sufficient to turn off transistor 205 may be applied.

Figure 5:
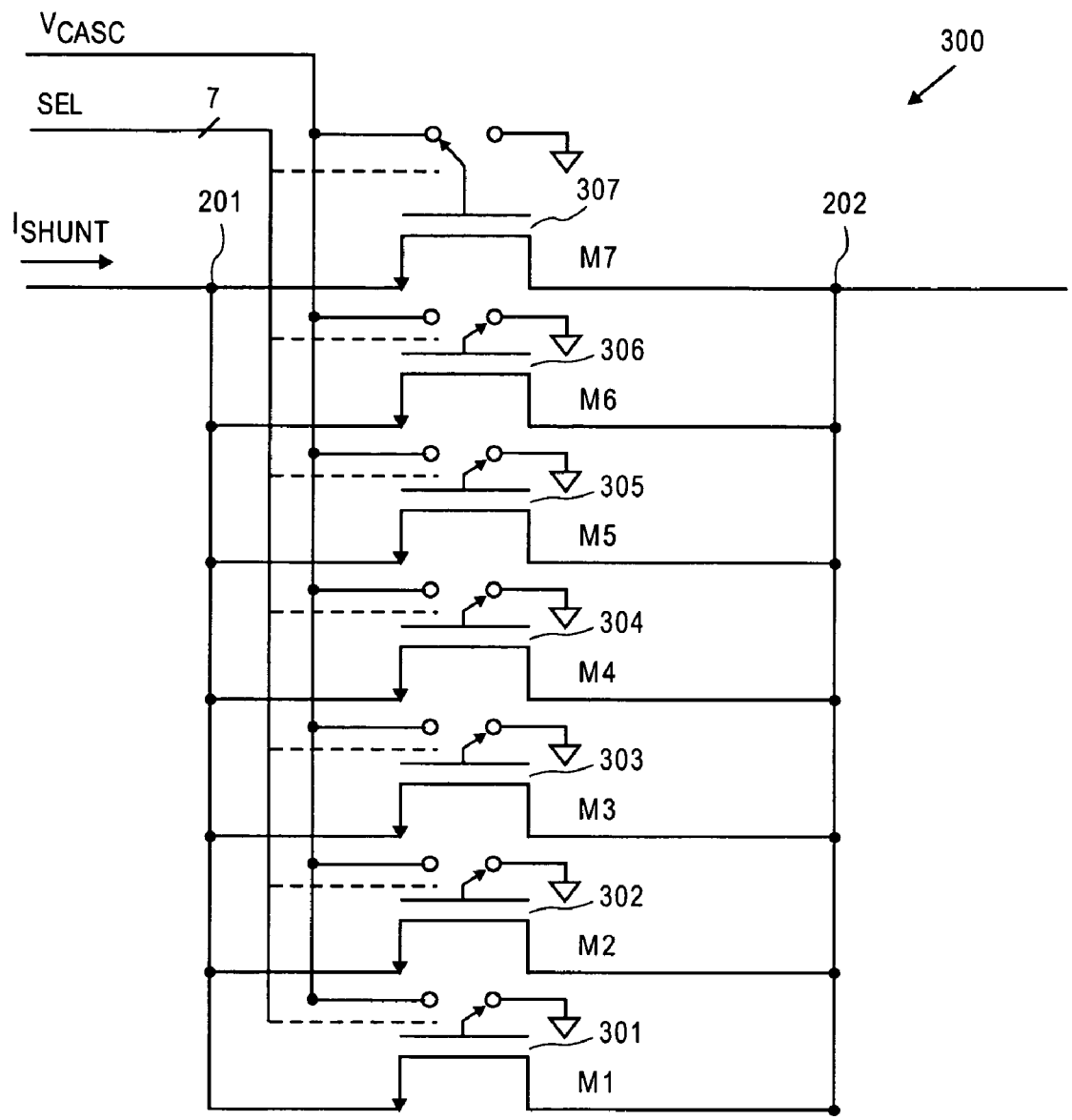
FIG. 5 is a circuit schematic diagram of an embodiment of a shunt transistor network used with the circuit of FIG. 4 to provide multiple gain factors that may be programmably controlled.

Also referring to FIG. 5, transistor network 300 shows one embodiment for implementing multiple transistors across nodes 201, 202. In the particular example, seven transistors 301-307 (also noted as M1-M7) are shown arranged in parallel across nodes 201, 202. Transistors M1-M7 comprise gain control network 105 of FIG. 3. The gates of M1-M7 are individually controlled by separate SEL signals so that each transistor activation may be controlled separately. In the particular example illustrated for network 300, M7 is shown in the activated position with $V_{BIAS}$ applied to the gate of M7, while the remaining transistors M1-M6 are shown in the deactivated state with the gates coupled to ground. The particular example of FIG. 5 shows the gates coupled to ground, but other embodiments may couple the gates to a low voltage that turns off the transistors M1-M7.

Since the amount of current flow between nodes 201, 202 is determined by the number of transistors in the turn-on state, $I_{SHUNT}$ is minimum when all transistors M1-M7 are off and $I_{SHUNT}$ is maximum when all transistors M1-M7 are on. Furthermore, since $I_{SHUNT}$ is inversely proportional to $I_{CASC}$ due to the current division of $I_{GM}$, maximum gain (minimum attenuation) is obtained from circuit 200 when M1-M7 are off and minimum gain (maximum attenuation) is obtained from circuit 200 when M1-M7 are all on. Intermediate gain ranges may be obtained by selectively activating/deactivating various combinations of M1-M7. Thus, by selectively turning on various transistors M1-M7, gain attenuation may be achieved in steps by increasing $I_{SHUNT}$ accordingly.

It is to be noted that the gain adjustment on the drive current is also applicable to the offset current, so that the offset current is scaled to the drive current. Thus, when the drive current is attenuated to such a level that a small drive current is fed to the mixer, the offset is attenuated proportionately, to prevent a significant LOFT in the mixer.

In FIG. 5, the SEL signal may be made programmable, so that various gain settings may be programmed. The SEL signal controls which one or combination of transistors M1-M7 are to be on. The activation/deactivation of M1-M7 is shown by manipulation of switches at the gates of M1-M7 for simplicity. However, various mechanisms may be used to apply voltages to the gates of M1-M7. Furthermore, the switching may be achieved remotely and not necessarily at the gate location of M1-M7, as shown.

Although various activation schemes may be implemented, one embodiment uses a sequential activation technique. In this technique, initial gain setting is set with only M7 turned on. The next lower gain setting is achieved by activating a second transistor, such as M6, so that both M6 and M7 are on. The subsequent lower gain settings are achieved by turning on an additional transistor at each step, until a lowest gain setting is achieved when M1-M7 are all on. As noted, this is one technique and many other sequences may be employed to establish the various gain settings.

Furthermore, the gain settings may be controlled by sizing the transistors. In some embodiments, all the shunt transistors may have the same characteristics, but in other embodiments, different characteristics may be attributed to the transistors. For example, some or all of the shunt transistors may be of different sizing. Thus, various design options are available to set the current values through the shunt transistors.

It is to be noted that with circuit 200, $V_{CASC}$ is also coupled to the gates of M1-M7 to activate M1-M7. One advantage of applying $V_{CASC}$ to transistors 101, 102 and the shunt transistors M1-M7 is that the gate-to-source voltage (Vgs) of these transistors are the same. Thus, any variations that are noted by these transistors affect the transistors in an equivalent manner, so that the transistors track each other. Accordingly, circuit variations that cause a change in $I_{SHUNT}$ also affect $I_{CASC}$ in an equivalent manner, so that the overall change is negligible.

For example, if transistors 101 and 102 have a transconductance value noted as gm1 and transistor 205 has a transconductance value of gm2, the relationship of $I_{CASC}$ to $I_{GM}$ may be expressed by:

$$I_{CASC} = I_{GM} \times \frac{\frac{1}{2} \times \frac{1}{gm2}}{\frac{1}{2} \times \frac{1}{gm2} + \frac{1}{gm1}}$$

The transconductance value gm1 may be expressed by:

$$\frac{1}{gm1} = \frac{1}{\mu_n C_{OX} \frac{W}{L}(V_{CASC} - V_{th})}$$

where $\mu_n$ is carrier mobility, $C_{OX}$ is the oxide capacitance of the transistor, W and L are the width and length dimensions of the transistor and Vth is the threshold voltage of the transistor 101, 102.

The transconductance value of gm2 may be expressed by:

$$\frac{1}{gm2} = \frac{1}{\mu_n C_{OX} \frac{W}{L}(V_{CASC} - V_{th} - V_{DS})}, V_{DS} \cong 0$$

in which $V_{DS}$ is deemed negligible for the shunt transistor (e.g. transistor 205).

The equations show that the current division at the node 201, as well as 202, is dependent strictly on the transconductance values gm1 and gm2, at least for the first order equations, and not on the transistor parameters which are affected by process, voltage and temperature. It is to be noted that in one embodiment, the shunt transistor or transistors operate in a triode region. That is, the shunt transistor 205 operates as a resistor such that the current relationship with respect to its drain-to-source voltage is linear. Accordingly, in some instances it is possible for the shunt transistors to operate with other than $V_{CASC}$ applied to the gates of the shunt transistors.

Figure 6:
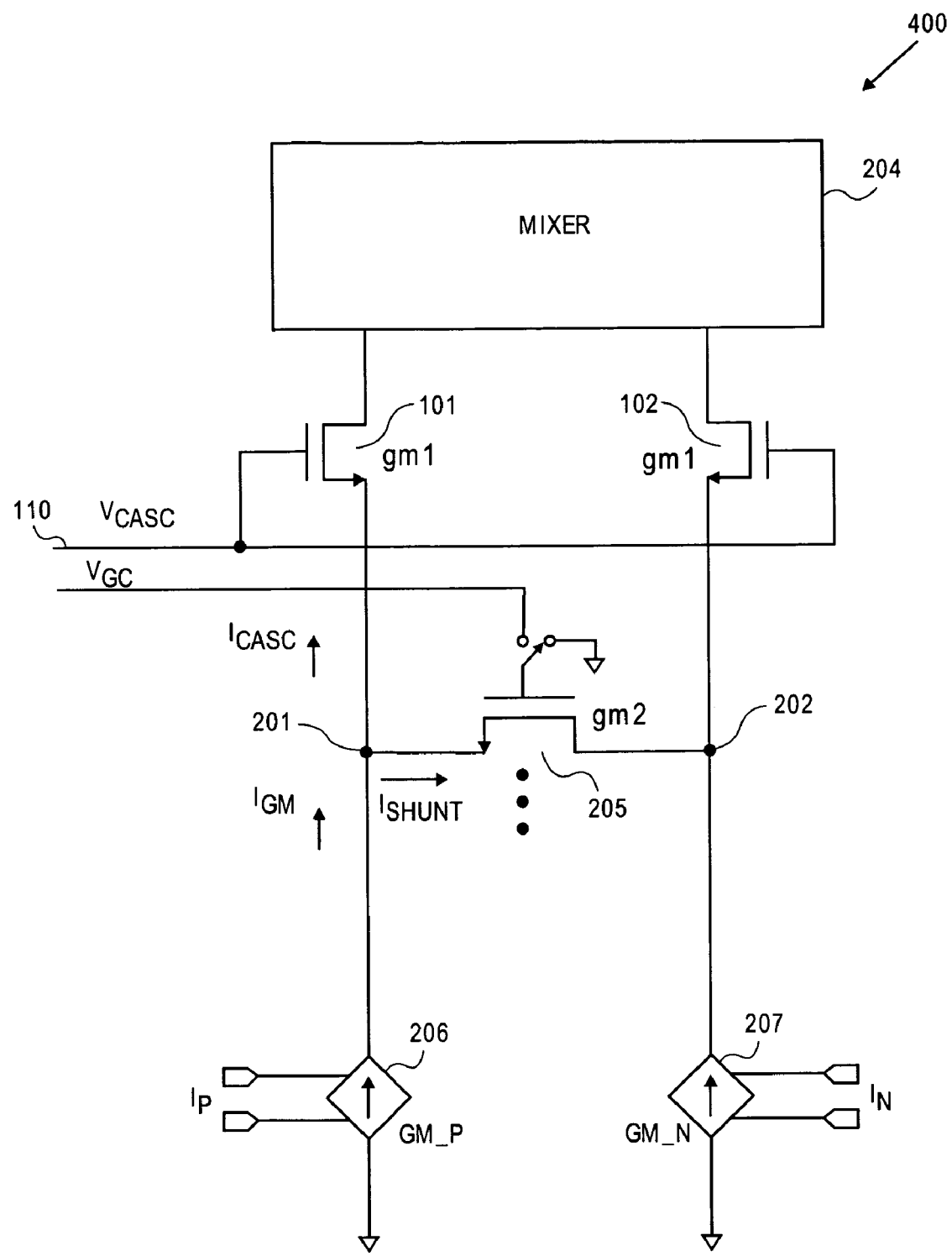
FIG. 6 is a circuit schematic diagram of another embodiment of a differential gain control circuit for the schematic diagram of FIG. 3, in which one or more shunt transistors are disposed across source terminals of cascode transistors, but in which a bias voltage applied to gates of the shunt transistors is different than the bias voltage applied to gates of the cascode transistors.

FIG. 6 shows a circuit 400 which utilizes a gate bias voltage $V_{GC}$ on the gate of the shunt transistor or transistors, instead of $V_{CASC}$. Again, although one shunt transistor is shown, multiple shunt transistors may be present. Circuit 400 is equivalent to circuit 200 of FIG. 4, except that a different bias voltage is coupled to the gate(s) of the shunt transistor(s). In the particular embodiment, supply voltage $V_{GC}$ is applied to the shunt transistor(s), instead of $V_{CASC}$.

Figure 7:
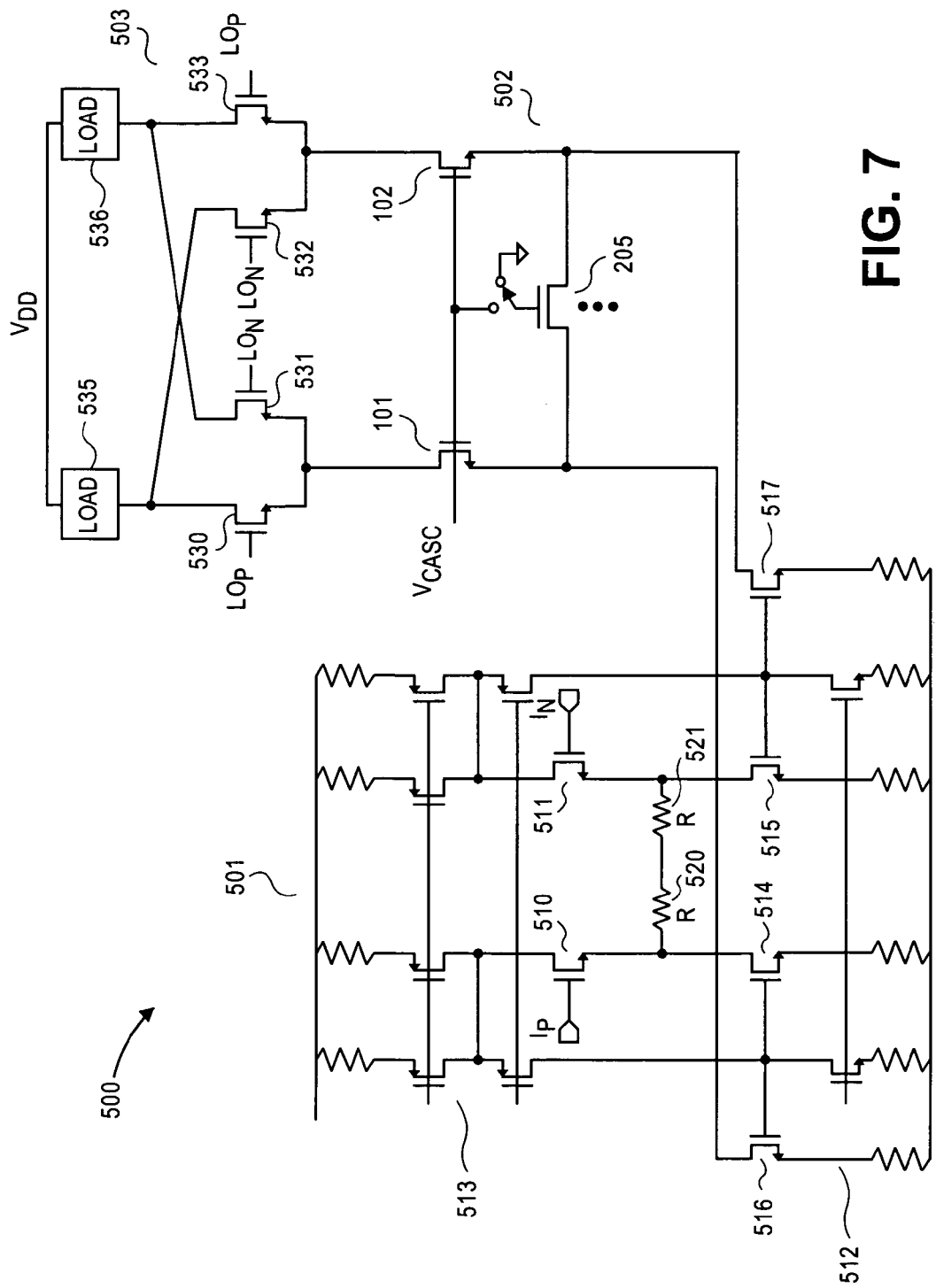
FIG. 7 is a circuit schematic diagram illustrating one example embodiment of a more detailed circuit for the circuit of FIG. 4.

Referring to FIG. 7, a more detailed schematic diagram of a circuit 500 is shown as one example embodiment that may be implemented for circuit 200 of FIG. 4. Circuit 500 includes a transconductance stage 501, cascode configured driver and gain stage 502 and mixer 503. Transconductance stage 501 is equivalent to stage 103 of FIG. 3. The driver stage 502 includes cascode transistors 101, 102 described above and one or more shunt transistors (represented by transistor 205) to control the gain of the current to mixer 503.

Although a variety of loads may be coupled to driver stage 502, circuit 500 shows one embodiment of a Gilbert cell mixer that is used with stage 502. Mixer 503 is comprised of two sets of transistor pairs 530, 531 and 532, 533, cross-coupled to drive mixer loads 535, 536. Sources of transistors 530, 531 are coupled to the drain node of transistor 101 and gated by the differential inputs of the local oscillator signal, noted as $LO_P$ (local oscillator "+" input) and $LO_N$ (local oscillator "−" input). Equivalently, sources of transistors 532, 533 are coupled to the drain node of transistor 102 and gated by the differential inputs of the local oscillator signal $LO_N$ and $LO_P$. The mixer mixes the gain adjusted signal from driver stage 502 with the local oscillator signal to provide an output, typically from the drain nodes of transistors 530-533. Mixer load 535, 536 typically is tuned to the mixed frequency output desired from the mixer stage.

The transconductance stage 501 includes input transconductance transistors 510, 511 to receive the input signals $I_P$ and $I_N$ and convert the input voltage to current. The sources of transistors 510, 511 are coupled to a current mirror driver network 512, which drives the differential output current to transistors 101, 102. The drains of transistors 510, 511 are coupled to a resistor/transistor network 513. Gain controlling resistors 520, 521 (shown as resistance R) are located across the sources of transistors 510, 511. It is to be noted that resistors 520, 521 may be made variable to change the resistance to vary the gain. However, generally in practice, resistors 520, 521 are fixed and the gain adjustment is achieved in gain stage 502, so that the offset is gain adjusted as well.

Transistors 510, 511 and resistors 520, 521 are configured as source followers and network 513 provides a negative feedback path to the gates of transistors 514, 516 and to the gates of transistors 515, 517 to boost the effective transconductance of stage 501 by increasing the loop gain. Transistor pairs 514, 516 and transistor pairs 515, 517 operate as differential current mirrors to provide the drive signals to transistors 101, 102. The offsets that are generated by components of networks 512, 513, and/or any offsets fed forward from a previous stage, are then gain scaled with the signal current in stage 502 to mix with the local oscillator signal in mixer 503.

Although circuit 500 may scale the gain of the offsets with the signal, it is possible that the offsets may still be appreciable enough to cause a local oscillator feedthrough (LOFT)

in the mixer. In order to compensate for the offsets to reduce or remove the LOFT, an offset compensation scheme may be implemented within circuit 500. Generally, DC offset components noted in the mixer may be compensated by introducing LOFT offset compensation into the mixer to cancel the offset. Accordingly, FIG. 8 shows one embodiment for introducing such offset compensation at the cascode transistors 101, 102.

Figure 8:
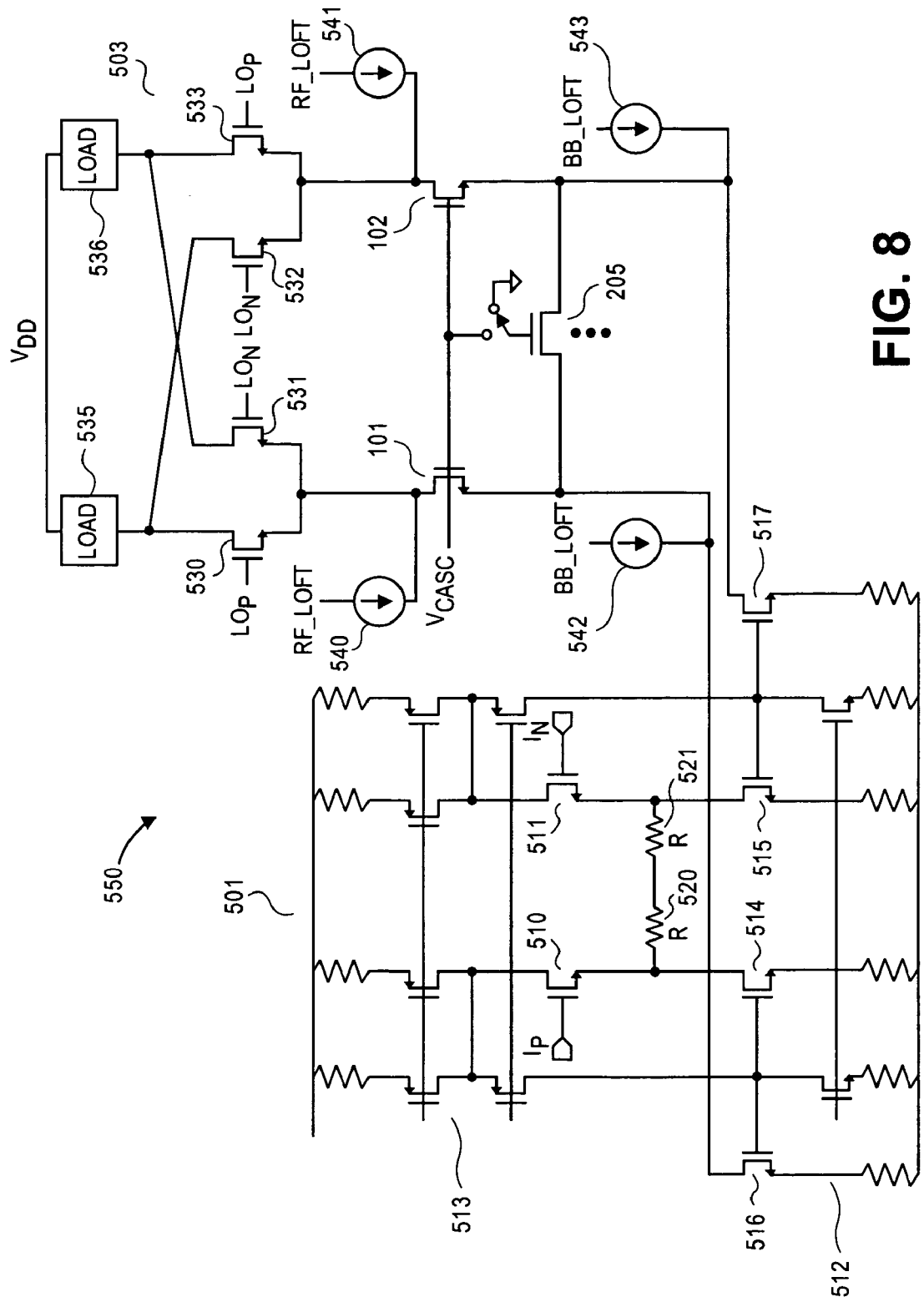
FIG. 8 is a circuit schematic diagram of FIG. 7 which also includes injection of separate RF_LOFT and BB_LOFT offset cancellation currents.

In FIG. 8, circuit 550 employs offset cancellation for two types of LOFT offsets. Circuit 550 is equivalent to circuit 500 of FIG. 7, but now has LOFT offset compensation. In the embodiment shown in FIG. 8, current sources 540 and 541 provide offset cancellation of radio frequency local oscillator feedthrough (RF_LOFT) offset, while current sources 542 and 543 provide offset cancellation of baseband local oscillator feedthrough (BB_LOFT) offset. Generally, BB_LOFT offset originates from the device offsets in the DAC, low-pass filter, the transconductance stage and any other baseband circuits in the signal path prior to the driver stage. The offset mixes with the LO and generate an LO component at the output of the mixer in the up-conversion module, such as up-conversion module 82 of FIG. 2. The RF_LOFT offset is a direct coupling component either through parasitic capacitance or mutual inductance from RF stage or stages, typically past the mixer. The RF_LOFT may become more severe with tighter die area of the chip. Having separate cancellation currents for BB_LOFT and RF_LOFT allow separate offset cancellation currents to be introduced into the mixer.

The two sets of currents, noted by current source pairs 540/541 and 542/543 remove LOFT offset by introducing an artificial offset. BB_LOFT offset cancellation currents cancel the offset prior to or at the gain control stage of circuit 550. As noted in the embodiment shown in FIG. 8, BB_LOFT offset cancellation currents (denoted by current sources 542, 543) are injected at the source terminals or nodes of transistors 101, 102. RF_LOFT offset cancellation currents (denoted by current sources 540, 541) are injected at the drain terminals or nodes of transistors 101, 102. Since the baseband gain control is also done at the driver transistors, circuit 550 scales the cancellation current by the same factor to maintain proper cancellation current without the need for a re-calibration.

Figure 9:
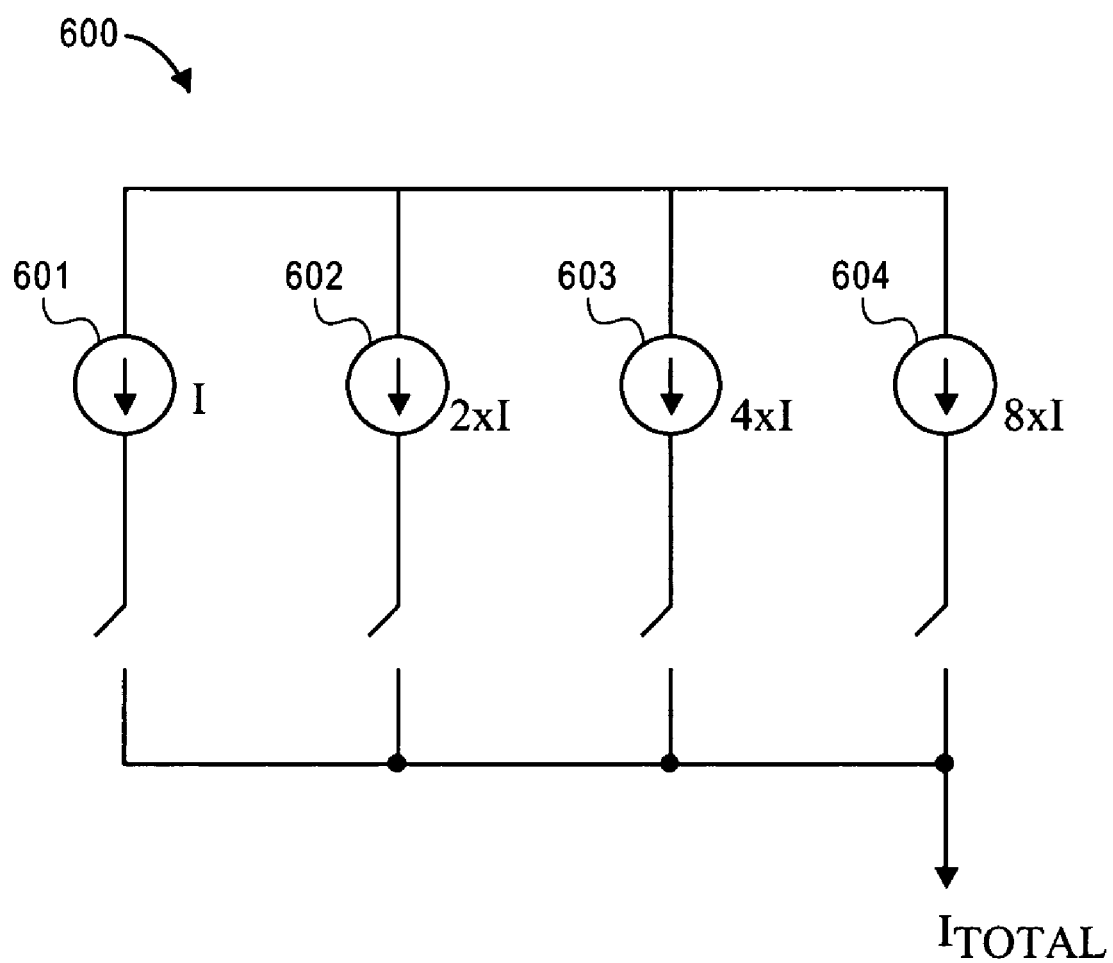
FIG. 9 is a circuit schematic diagram showing one embodiment of an IDAC circuit that may be used to generate one or more of the cancellation currents of FIG. 8.

It is to be noted that a variety of techniques may be employed to control the amount of cancellation current that is to be introduced to compensate for the offsets. In one embodiment, one or more of current sources 540-543 is/are stepped through current values using a binary weighted current digital-to-analog converter (IDAC), so that BB_LOFT and/or RF_LOFT cancellation currents may be injected at the corresponding nodes. One embodiment for an IDAC to control current flow is shown in FIG. 9. IDAC 600 is stepped through current source values having binary weights of 1, 2, 4 and 8. By controlling which one or more of the four current sources 601, 602, 603 and 604 are activated, current values from 1×I to 15×I (in integer increments) may be selected for the offset cancellation current $I_{TOTAL}$ being sourced or sinked at each of the source and/or drain nodes of the cascode transistors. IDAC 600 is but one example of how to select values for offset cancellation current(s). It is appreciated that various other compensation techniques may be employed as well and is not limited to the particular embodiment shown using current sources 540-543.

Figure 10:
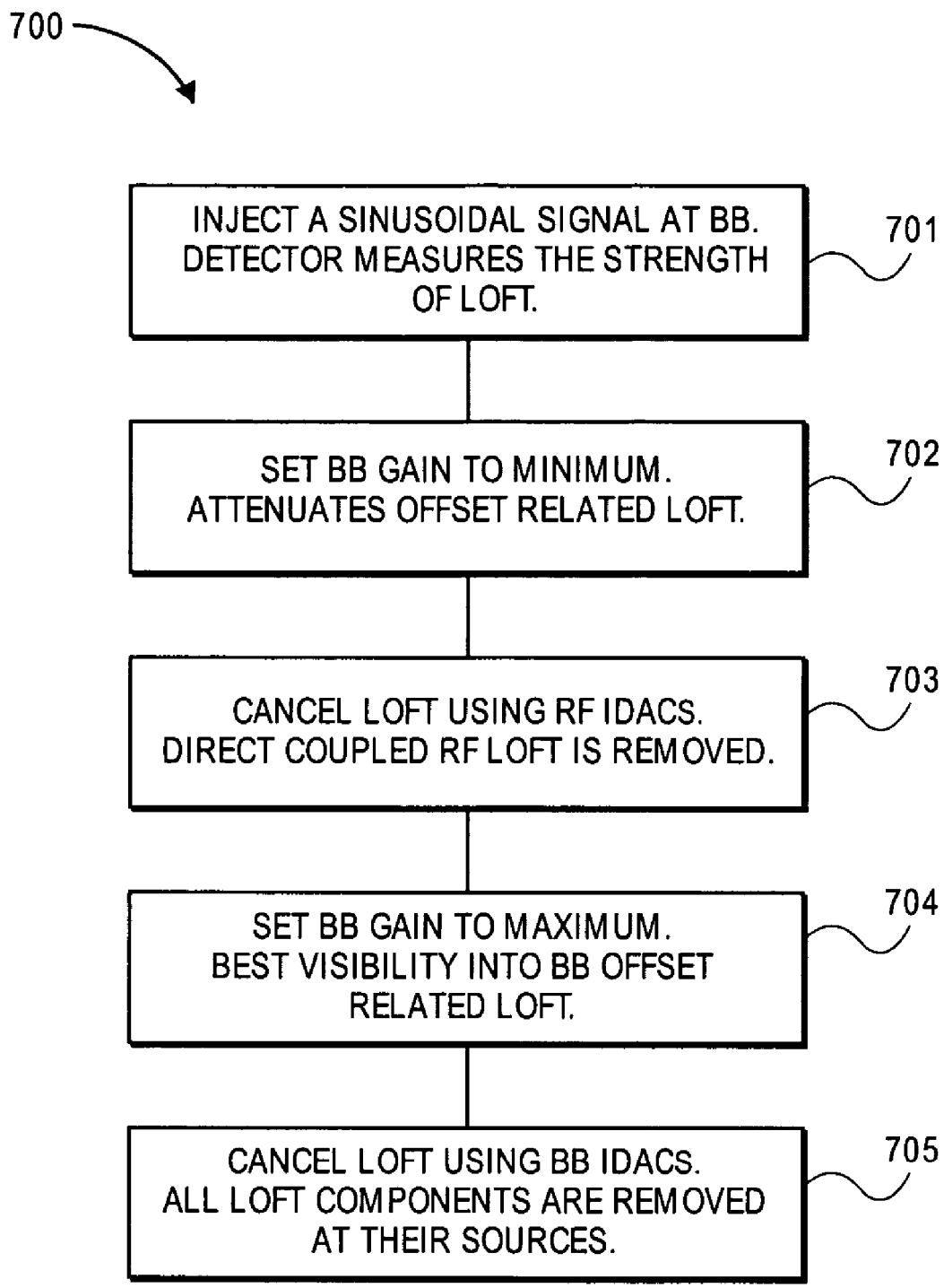
FIG. 10 is a flow diagram showing one example technique to set BB_LOFT and RF_LOFT cancellation currents at circuit initialization.

A variety of techniques may be devised to set the operating values for the offset cancellation currents. In one embodiment shown in FIG. 10, a technique is described for setting the cancellation currents at initialization of the circuit (such as at start up, reset, etc.) to compensate for BB_LOFT and RF_LOFT offsets. As shown in diagram 700, a sinusoidal signal at a baseband frequency is injected and a detection mechanism (such as detecting the frequency spectrum of the mixer output) is used to measure the strength of the LOFT (block 701). Next, the baseband gain is set to minimum (such as by adjusting circuit 502) to minimize the baseband LOFT (block 702). The BB_LOFT offset is attenuated so that essentially, most or all of the offset now present may be attributed to RF_LOFT at this minimum baseband gain setting. The direct coupled RF_LOFT cancellation is obtained by injecting RF_LOFT offset cancellation currents of source pairs 540, 541 by selecting the proper IDAC cancellation value (block 703) to cancel the offset. Then, the baseband gain setting is set to maximum gain. Since RF_LOFT offset has been cancelled with the previous action, any LOFT offset remaining may now be attributed to BB_LOFT (block 704). Finally, BB_LOFT offset cancellation is now achieved by injecting BB_LOFT offset cancellation currents of source pairs 542, 543 to cancel the LOFT. With RF_LOFT offset cancelled earlier, the change in the baseband gain does not appreciably affect the RF_LOFT component, so the offset cancellation action at this point, cancels the remaining BB_LOFT offset (block 705). Now both BB_LOFT and RF_LOFT offsets have been canceled. The gain control may now be set to the desired operating point without concern for offsets, since the offsets are being canceled by the cancellation currents.

It is to be noted that the offset cancellation schemes described above may be used in various types of transconductance stages that drive an up-conversion stage or module having a mixer, including a mixer that is placed in a transmission path of a radio (such as up-conversion module 82 of FIG. 2) and implemented in a wireless device (such as one or more devices shown in system 10 of FIG. 1). The offset technique may be employed for both an in-phase (I) mixer and a quadrature (Q) mixer. The technique of FIG. 10 may also include a technique to cancel I/Q imbalance in the mixer, along with the LOFT cancellation. It is to be noted that the technique of diagram 700 is but one embodiment and that other schemes of generating cancellation signals to compensate for BB_LOFT and/or RF_LOFT offsets may be readily implemented within the framework of practicing the invention.

Thus, a local oscillator feedthrough cancellation scheme to remove RF and baseband offsets is described.

We claim:

1. An apparatus comprising:
   a differential driver to receive a baseband signal from a transconductance stage and to drive the baseband signal, wherein the differential driver includes a gain stage across positive and negative differential inputs of the differential driver to adjust a gain of the baseband signal, in which the differential driver also drives a first cancellation current at the differential inputs to cancel a feedthrough offset between the positive and negative differential inputs of the differential driver that results at a baseband frequency and in which the first cancellation current is subject to proportional gain adjustment by the gain stage as the baseband signal, and the differential driver drives a second cancellation current at a differential output of the differential driver to cancel a feedthrough offset that results at a radio frequency (RF) that is coupled back to the differential driver from a RF stage; and
   a load coupled to the differential driver to be driven by the differential driver, in which RF and baseband frequency offsets between positive and negative sides of the differential driver are cancelled.

2. The apparatus of claim 1, wherein the load is a mixer to mix the baseband signal and a local oscillator signal to generate a RF signal.

3. The apparatus of claim 2 wherein the second cancellation current is to be used to cancel a RF local oscillator feedthrough offset which is caused by parasitic capacitance or mutual inductance coupling from the RF stage past the mixer.

4. The apparatus of claim 2, wherein the first and second cancellation currents are generated by current sources coupled to the driver.

5. The apparatus of claim 4, wherein the current sources are binary weighted current digital-to-analog converters to step through current values to obtain appropriate values for the first and second cancellation currents.

6. An apparatus comprising:
a mixer;
a differential driver to receive a baseband signal from a transconductance stage and to drive the baseband signal to the mixer, wherein the differential driver includes a gain stage across positive and negative differential inputs of the differential driver to adjust a gain of the baseband signal;
a first offset cancellation circuit coupled to the differential inputs of the differential driver to introduce a first cancellation current into the differential driver to cancel a feedthrough offset between the positive and negative differential inputs of the differential driver that results at a baseband frequency and in which the first cancellation current is subject to proportional gain adjustment by the gain stage as the baseband signal; and
a second offset cancellation circuit coupled to the differential driver to introduce a second cancellation current at a differential output of the differential driver to cancel a feedthrough offset that results at a radio frequency (RF) that is coupled back to the differential driver from a RF stage.

7. The apparatus of claim 6, wherein the mixer is used to mix the baseband signal and a local oscillator signal to generate a RF signal.

8. The apparatus of claim 7, wherein the driver includes at least a pair of transistors disposed in a differential cascode arrangement with their gate terminals coupled to receive a bias voltage, their source terminals coupled to receive the baseband signal differentially from the transconductance stage, and their drains coupled to differentially drive the mixer.

9. The apparatus of claim 8, wherein the first offset cancellation circuit is coupled to the source terminals of the pair of transistors and the second offset cancellation circuit is coupled to the drain terminals of the pair of transistors.

10. The apparatus of claim 9, wherein the second cancellation current is to be used to cancel a RF local oscillator feedthrough offset which is caused by parasitic capacitance or mutual inductance coupling from the RF stage past the mixer.

11. The apparatus of claim 9, wherein the first and second offset cancellation circuits include current sources to generate the first and second cancellation currents.

12. The apparatus of claim 11, wherein the current sources are binary weighted current digital-to-analog converters to step through current values to obtain appropriate values for the first and second cancellation currents.

13. A method comprising:
injecting a calibration signal at a baseband frequency into a differential driver that drives a differential signal to a mixer, the differential driver having a gain stage across positive and negative differential inputs of the differential driver to adjust gain of a baseband signal;
setting gain of the gain stage to minimum;
detecting an output from the mixer to determine an amount of local oscillator feedthrough (LOFT) offset that is attributed to radio frequency (RF) feedback from a RF stage;
measuring an amount of RF LOFT offset due to the RF feedback;
injecting RF LOFT offset cancellation current at a differential output of the differential driver to cancel the RF LOFT offset;
setting gain of the gain stage to maximum after adjusting for the RF LOFT offset;
detecting an output from the mixer;
measuring again an amount of LOFT offset; and
injecting baseband LOFT offset cancellation current at differential inputs of the differential driver to cancel LOFT offset attributed to baseband offset from a previous stage, in which the baseband LOFT cancellation current and differential input current from the previous stage are subject to proportional gain adjustment by the gain stage, wherein RF LOFT and baseband LOFT offsets between positive and negative sides of the differential driver are cancelled.

14. The method of claim 13 wherein injecting the baseband LOFT offset and injecting RF LOFT offset cancellation currents include sourcing the cancellation currents from current sources.

15. The method of claim 14 wherein injecting the baseband LOFT offset cancellation current includes injecting the baseband LOFT offset cancellation current at a source terminal of a driver transistor and injecting the RF LOFT offset cancellation current includes injecting the RF LOFT offset cancellation current at a drain terminal of the driver transistor.

16. The method of claim 14 wherein sourcing the cancellation currents includes sourcing the cancellation currents from binary weighted current digital-to-analog converters to step through current values to obtain appropriate values for the offset cancellation currents.

17. The method of claim 14 further including mixing a baseband signal from the differential driver with a local oscillator signal in the mixer to generate a mixed output signal from the mixer that is free of baseband LOFT and RF LOFT offsets.

\* \* \* \* \*